United States Patent [19]

Winner

[11] Patent Number: 4,692,569
[45] Date of Patent: Sep. 8, 1987

[54] AIRLINE ELECTRICAL GROUND CABLE FEED OUT AND RETRIEVAL STORAGE APPARATUS

[76] Inventor: Sol N. Winner, 28 Nassau Cir., Creve Coeur, Mo. 63141

[21] Appl. No.: 481,667

[22] Filed: Apr. 4, 1983

[51] Int. Cl.⁴ ............................................. H02G 11/00
[52] U.S. Cl. ............................ 191/12 R; 191/12.2 A; 226/187; 254/382
[58] Field of Search ................... 180/87.01; 191/12 R, 191/12.2 R, 12.2 A; 312/271, 276, 320; 200/153 F; 226/118, 119, 186, 187; 254/287, 382

[56] References Cited

U.S. PATENT DOCUMENTS

| | | | |
|---|---|---|---|
| 1,245,317 | 11/1917 | Cashner | 180/87.01 |
| 1,717,384 | 6/1929 | Johnson | 180/87.01 |
| 2,781,456 | 2/1957 | Buckeridge | 191/12.2 A |
| 3,148,261 | 9/1964 | Schlenz | 200/153 F |
| 3,172,510 | 3/1965 | Lee et al. | 191/12.2 A |
| 3,859,481 | 1/1975 | Sprague | 191/12.2 R |
| 3,990,551 | 11/1976 | Jamison et al. | 191/12 R |

Primary Examiner—David A. Scherbel
Assistant Examiner—David F. Hubbuch

[57] ABSTRACT

In an aircraft cable feed out and retrieval storage apparatus, a storage compartment communicates with an assembly housing, having an inclined wall connecting between the two, with the assembly housing incorporating a base that mounts a pair of friction wheels, one of the wheels being an idler wheel, that is shiftable, and can exert pressure upon the ground cable arranged intermediate thereof, so that upon energization of a motor operatively associated with the other frictional drive wheel, the ground cable can be fed out, or retrieved, as required; the apparatus can be installed suspended to the underside of the passenger tunnel of an airline terminal, supported upon legs for mounting to the ground, or be conveyed upon wheels, and moved through actuation of a handle. The base of the assembly housing is pivotally mounted, or removable, to provide immediate access to its operating components and to facilitate their prompt servicing.

27 Claims, 9 Drawing Figures

AIRLINE ELECTRICAL GROUND CABLE FEED OUT AND RETRIEVAL STORAGE APPARATUS

BACKGROUND OF THE INVENTION

This invention relates generally to a storage means, and more specifically pertains to an airline electrical ground cable feed out and retrieval storage apparatus wherein airline cable is dispensed by mechanical power to the vicinity of the aircraft, and conveniently retracted into the apparatus for storage through assembly drive means that function through friction wheels, effectively maneuvering the cable during apparatus operation.

Various styles of cable retrieving means have been available in the prior art, and even in certain instances, have been used in conjunction with aircraft ground cable, but normally the cable handling devices as employed at airline terminals have been rather bulky of size, rather permanent of installation, and are somewhat inconvenient of usage, and more specifically difficult of servicing.

An early example of a cable handling means is shown in the U.S. Pat. No. 3,183,301, to Konpanek, Jr., et al, and which simply relates to a flexible push-pull cable device wherein a cable may be fed to a remote or normally inaccessible location through the use of its delivery device.

The U.S. Pat. No. 3,646,282, to Herring, Jr., discloses a vehicle control line connection, as employed for use with one of the mobile passenger transfer buses normally employed at airline terminals, and wherein a cable delivery device is provided upon the underside of its pod, and useful for feeding out some electrical cable particularly when the passenger cab is elevated or lowered with respect to its supporting columns. This particular control line connection is primarily for use with the vehicle that is subject to extensive vertical movement, such as identified and shown in this particular patent.

The patent to Sprague, U.S. Pat. No. 3,859,481, discloses a telescoping power support system, for a passenger walkway installed at an airline terminal, and wherein the support cable is held to a plurality of extensible trolleys and movable upon their underside therewith, so that the cable may be fed out from its back end, and all the way to the vicinity of the disclosed aircraft, for providing and furnishing electricity or ground support. It would appear that this particular device is quite distinct and dissimilar from the current invention, since the ground support equipment of the current invention secures to the end of the passageway of a passenger tunnel, and provides for a feed out of cable for delivery to the aircraft itself, and not entirely along the associated passenger loading bridge.

The patent to Scott, U.S. Pat. No. 4,212,421, shows a retrieval and storage device for flexible elements, disclosing the use of a pair of wheels that are useful for feeding out of cable, or retracting it, as desired. This particular feature, as disclosed, is generally old in the art.

The U.S. Pat. No. 4,253,914, to Fogelberg, discloses a feeding device for, once again, delivering or withdrawing electrical cable, or other cable, as from a deep channel bottom, and this particular device, as can be seen, utilizes the pair of feed wheels for delivering out of the flexible cable, or for retracting the same, as required.

The prior art, as previously explained, generally shows the concept of providing cable delivery and retracting mechanisms, even those that function through the use of a pair of wheels for frictionally motivating the delivery of cable either to a source of usage, or to its storage area, but the current invention, as distinct therefrom, generally relates to a specific style of cable handling mechanism, wherein storage means is especially designed to facilitate the reception or dispensing of its ground cable, as for use in conjunction with the aircraft, and incorporating a specifically styled apparatus that has other features that significantly enhance and facilitate its application, handling, and servicing, generally only requiring the efforts of only a single maintenance men.

It is, therefore, the principal object of this invention to provide an aircraft ground cable storage apparatus that has multiple applications, as during usage, and which can be either permanently installed at the vicinity of the aircraft, stably secured to the ground, or even motivated as a portable unit, as desired.

Another object of this invention is to provide an aircraft ground cable feed out and retrieval mechanism incorporating a cable moving assembly that is effective in operation, but can be easily and quickly exposed for prompt servicing when required.

Still another object of this invention is to provide a rather compact ground cable storage apparatus that can be conveniently mounted to the underside of a passenger tunnel leading to the aircraft.

Yet another object of this invention is to provide a ground cable storage apparatus that can be permanently installed at ground level, to provide for a quick connection of its ground cable to a landed craft during servicing.

Still another object of this invention is to provide a ground cable handling apparatus that is constructed portable, and can be easily moved through the manipulation of its handle, or promptly locked into position by means of integrated brake means.

Another object of this invention is to provide a cable moving assembly which incorporates various operating components that assure a sustained feed out or retrieval of the aircraft ground cable, provides consistent performance, due to the arrangement of various friction wheels and guide rollers functioning to effectively align the cable during its handling.

Yet another object of this invention is to provide various locating means having select electrical switches responsive thereto so as to provide for a shutoff in the retraction of the cable after usage, or to assure that its dispensing terminates as the cable approaches the limit of its feed out.

Yet another object of this invention is to provide a ground cable handling mechanism that is very compact of construction, easy of assembly, facile of installation, and effective in usage so that its delivery and retrieval of the ground cable can be easily performed by a single ground mechanic.

These and other objects may become more apparent to those skilled in the art upon reviewing the summary of this invention, and upon undertaking a study of the description of its preferred embodiment, in view of the drawings.

SUMMARY OF THE INVENTION

This invention contemplates the formation of a storage like compartment, incorporating a series of walls, to form its enclosure, and being of a size of accommodate the length of ground cable customarily required for providing proper operations to the aircraft during passenger deplaning, boarding, and servicing, with the enclosure forming an assembly housing at its upper frontal location, and communicating with the storage compartment through an inclined front wall that facilitates the transfer and positioning of the ground cable through a pair of friction wheels that are mounted for actuation and operation upon a base means formed of the assembly housing. The base means actually forms the support for the cable moving assembly, which comprises a pair of friction wheels, one of which wheel is actuated for rotation through the agency of a motor means, while the other wheel is adjustably mounted, upon its axle, so that is may be shifted towards or away from the first mentioned wheel, as when the cable is being inserted or removed from operation. The shiftable friction wheel is held by a spindle or axle to the base of the assembly housing, and a clamp means normally exerts pressure for biasing of the said wheel towards the motor actuated drive wheel, and locates the peripheries of the two said wheels at a distance that is desirably less than the diameter of the cable biased intermediate thereof, and to be fed out or retrieved during functioning of this mechanism.

The cable moving assembly, as mounted upon its base means, is readily disposed for servicing, as it may be hingedly mounted to the assembly housing, or the storage compartment, and simply pivoted in a direction that exposes its various operative components affording them for prompt servicing. On the other hand, it is just as likely that the base wall or means of the assembly housing may be held in place by means of fasteners, or supported by means of angles, so that the entire assembly may be slid out, in the manner of a drawer, to expose its various operating components, for prompt servicing, or for installation of the cable to be maneuvered.

The apparatus, including its various housings and compartments, which are integrally formed communicating as a unit, may include a bracket, as mounted upon its upward surface, for securement more permanently to the underside of the passenger tunnel, at the airline terminal, or the unit may be mounted upon legs, and stably supported upon the ground, at a position where is exposes its cable for prompt electrical installation, but not at a position where it will interfere with the maneuvering of the aircraft as during landing or when commencing its movement to the apron for takeoff. In addition, and where this ground support mechanism may be required for use in conjunction with aircraft that may be landed at various locations about the terminal, and where passenger tunnels, or other locations for deplaning, may not be defined, this ground cable handling mechanism may be portably constructed, having its combined storage compartment and assembly housing mounted for wheeled movement, to be pulled in place, after the manipulation of a handle or the like, and may further incorporate brake or stop means that can provide for the fixed locating of the device at a precise point, as when its cable may be joined to the aircraft to provide ground power to it during servicing, or passenger handling.

It is common in the handling and maintenance of aircraft, particularly when grounded, or when passengers are deplaning and the craft is being serviced, that this ground cable be electrically connected with the aircraft, and thereby supply it with sufficient electrical power to provide for the continued functioning of its various electrical components that require such energy during the planes down time. For example, the lighting, heating in winter, or air conditioning in the warm summer, in addition to the other great variety of electrically operated components that are included within the assembly of an aircraft must be continued to be supplied with electrical charge, from the ground, in order to sustain their operations. Usually, such cable is of a sufficient length to provide for its interconnection between the source of electrical energy at the terminal, to allow the cable to extend out to the craft, and be plugged in, or otherwise electrically connected. With the current invention, the length of such cable need only be in the vicinity of approximately forty to eighty feet, generally includes a series of electrical wires, all contained within a single flexible conduit, and normally approaches approximately two inches in diameter in their composite. The cable usually functions at a rather high frequency, of approximately four hundred hertz, and embodies six hundred VAC insulation for its outer cover. It is this type of cable, which is of rather substantial size, that requires manipulation by the ground cable handling device of this invention, so as to provide for a prompt feed out of the cable as it is being delivered to the aircraft for immediate electrical connection, or provide for its accelerated retrieval, in order to get it out of the way, and clear the aircraft for taxiing to the apron and eventual takeoff. The manual handling of such a cable, due to its size, weight, and bulk, is out of the question.

BRIEF DESCRIPTION OF THE DRAWINGS

In referring to drawings.

DESCRIPTION OF THE PREFERRED EMBODIMENT

Figure 1:
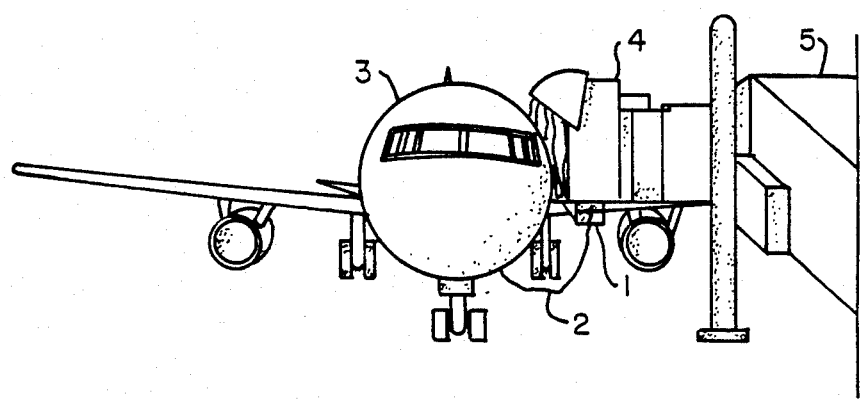
FIG. 1 provides a view of an airline passenger tunnel, its loading bridge, an airline positioned adjacent thereto, and the ground cable handling apparatus of this invention being suspended to the underside of the passenger tunnel, and showing its ground cable connecting with the airline for furnishing it with electrical power as during servicing.

In referring to the drawings, and in particular FIG. 1, the aircraft electrical ground cable feed out and retrieval storage apparatus of this invention, is shown at 1, and is disclosed as having its cable 2 sufficiently withdrawn so as to allow for its plug-in to the aircraft 3, as shown, and which is maintained adjacent to the expandable passenger tunnel 4 of the terminal 5. The apparatus 1 of this invention is disclosed in that particular embodiment where it is permanently mounted to the underside of the loading bridge 4 for the passenger terminal 5.

The structure of this invention is more accurately disclosed in FIGS. 1 through 6, and shows a storage compartment 6 having an assembly housing 7 integrally formed at the upward frontal portion of the compartment 6, and which incorporates a rather inclined wall 8 that connects between these two areas. The advantage of the inclined wall 8 is to provide for a surface to facilitate the smooth transition of the ground cable as it is either being fed out of the storage compartment, or delivered thereto, without having it encounter any sharp edges, or corners, as would be the case if this frontal lower wall of the storage compartment where arranged exactly vertically. On the other hand, while the inclination for this particular wall 8 is desirable, it is yet within the consideration of this invention that such wall may be arranged vertically with respect to the storage compartment, and its integration into the assembly housing area 7 as previously defined. Both the storage compartment and assembly housing have a common upper wall 9, include a pair of side walls 10 and 11, incorporate a back wall 12, and a bottom wall 13.

Provided across the top wall 9 is a bracket 14, which may be in the shape of the Z-bar, or two other configurations, as shown, and which facilitates the suspended mounting of the apparatus 1 to the underside of the passenger tunnel, as previously disclosed and described with respect to the embodiment shown in FIG. 1. The assembly housing 7 is disposed for supporting and containing the cable moving assembly 15 of this invention. This particular assembly includes a base means 16, and which incorporates a series of connectors, as at 17, disposed at each corner, and which when slid into the lower area of the assembly housing 7, become aligned with the apertures 18 provided through the side walls 10 and 11, and through which fasteners 19 may locate for securement of the base means 16, and its various cable moving components therein. Thus, one of the essences of this invention is to provide a quick method for servicing this particular cable handling device, in the event that a malfunction occurs, and this can be promptly achieved through a simple removal of the fasteners 19, and a withdrawal of the assembly 15 therefrom. Or the front fasteners 19 may be removed, and the assembly pivoted downwardly about its rear fasteners.

As an alternative method, the lower edges of the side walls 10 and 11 at the region of the assembly housing 7 may include the angles 20, so that the base means 16 can be supported thereon, when slid into the said assembly housing, so that once the fasteners 19 are removed, the entire base means 16, and its assembly components, can be slid forwardly, in the manner of removal or opening of a drawer, in order to expose its various operating components for prompt servicing. One additional method of mounting of this cable moving assembly 15 to the region of the assembly housing 7 will be subsequently analyzed, wherein it may be hinged in place in order to provide for its prompt installation, or removal, as required.

Figure 2:
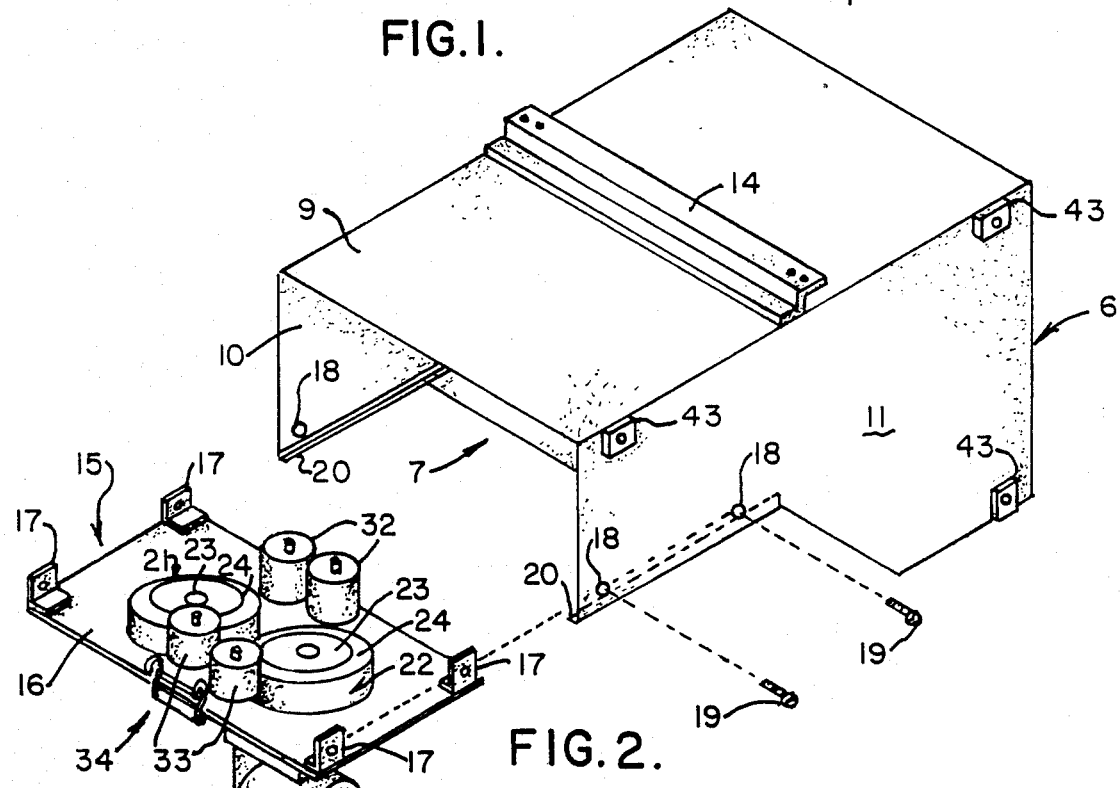
FIG. 2 provides an isometric view of the apparatus of this invention, having its cable moving assembly shifted forwardly, clear of its assembly housing, as when its operative components are exposed for servicing.
Figure 4:
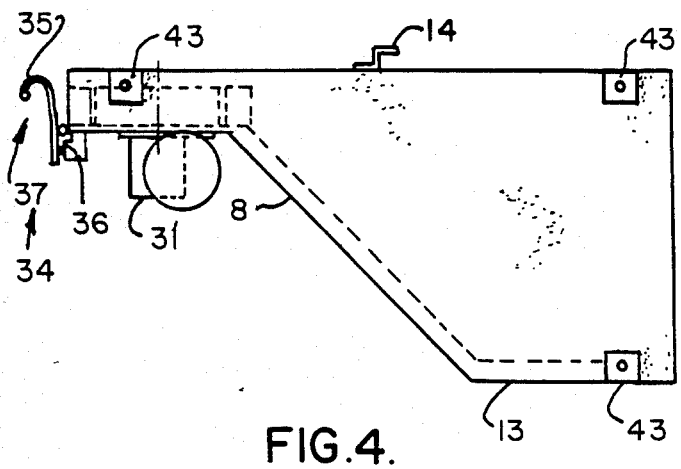
FIG. 4 provides a side view of the apparatus shown in FIG. 2.
Figure 5:
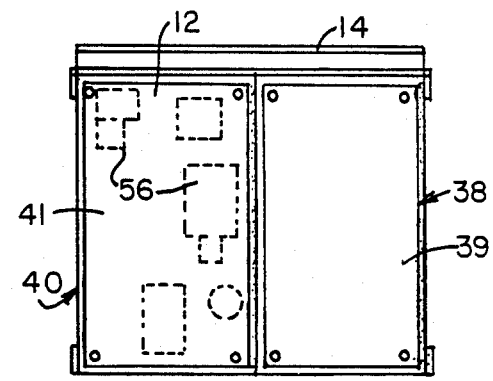
FIG. 5 provides a back view of the apparatus shown in FIG. 2.
Figure 6:
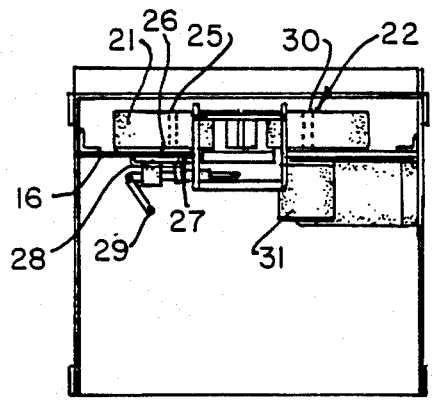
FIG. 6 provides a front view of the apparatus shown in FIG. 2.

The cable moving assembly 15, once again, is more accurately depicted in FIGS. 2 and 4, and includes a pair of friction wheels 21 and 22, with preferably each wheel comprising an inner hub portion 23 and having a frictional type material, such as rubber, or the like, as at 24, surrounding its perimeter, in order to enhance the frictional engagement and grasping of the cable during its feed out or retrieval. The wheel 21 comprises an idler type friction wheel, is mounted upon its axle 25, and which axle extends downwardly through an elongated slot 26 provided within the base means 16, in order to provide some distance for the lateral sliding of the idler wheel 21 with respect to the drive wheel 22. A slide plate 27 is located beneath the base 16, has the axle 25 connecting therewith, and the slide plate 27 is disposed within a guide 28 that fixes the location and dimension for sliding of the slide plate 27, and the axle 25, upon the base means 16. An expansion clamp 29 is provided biasing against the slide plate 27, and this particular clamp is of the type of eccentric or other form of clamping means, which when compressed into engagement, exerts a spring pressure against the left side edge, as shown in FIG. 6, of the slide plate 27, in order to constantly urge the idler friction wheel 21 towards the drive wheel 22, and therein exert a continuous pressure against the cable, that will be arranged intermediate these two friction wheels. This particular types of plunger style of clamp means of spring loaded clamp may be of the type that is manufactured and marketed by Carr-Lane Manufacturing Company, of St. Louis, Mo., and is available for usage for this particular purpose. In addition, such a clamp may include a spring means, as known, for constantly urging a biasing pressure against the slide plate 27, in order to provide a little more flexibility in the degree of force and pressure exerted upon the cable, and to compensate for any irregularity in the surface dimensions of the cable, which can frequently be present, in a cable of this type and of this diameter, and which incorporates integrally internally of its insulating cover a series of individual electrical cables, as previously summarized.

The drive wheel 22 is mounted upon its axle 30, and which axle is stably mounted upon the base member 16, for rotation therewith, and said axle is connected with, or is an extension of, the drive shaft of the combined electric motor and gear box or speed reducer 31, which is mounted also to the underside of the base means 16, of the cable moving assembly. This feed out and retrieving motor may comprise a motor of sufficient capacity to effect the frictional engagement and movement of the cable arranged intermediate the friction wheels, and as an example, a one-half horse power reversing motor, that operates at approximately four hundred sixty VAC three phase, at sixty hertz, has been found satisfactory for this purpose. Obviously, motors of other capacity may be just as useful, such as a 90 VDC permanent magnet motor, 1874 rpm, one-half or one-third horsepower motor, but it is desirable that it be a reversing type motor, in order that both feed out of the cable, and the retrieval of the same, can be achieved.

Also mounted upon the base member 16 are a series of guide rollers, such as the pair of rear guide rollers 32, and the front guide rollers 33, that are useful for maintaining the cable properly positioned intermediate the friction wheels, as disclosed. It should be noted that these guide rollers, in addition to the friction wheels, are of sufficient height, so as to fit conveniently within the assembly housing 7, and be somewhat to the region, at their upper dimensions, in reasonably close proximity with the interior of the top wall 9, so that the ground cable cannot lift upwardly, and become disengaged from its location between the friction wheels 21 and 22, or the said guide rollers.

Provided along the frontal edge of the base member 16 is a locating or reel device 34, comprising a pivotally mounted frame member 35, which is spring biased slightly forwardly of the said base, and at its lower end contacts a switch or micro-switch 36, such that when the cable has reached its position of full retraction or retrieval, it will push against this frame member 35, pivot its upper portion slightly rearwardly, and its lower portion forwardly, for disconnection of the switch 36, in order to shut off the operations of the motor 31, and discontinue any further retrieval of said cable. The cable extends through the central opening of this frame member, as through the region of 37, for extension rearwardly across the base member 16, through the various guide rollers 32 and 33, and arranged pressured intermediate the friction wheels 21 and 22, as previously defined.

Located at the region of the back of the storage compartment 6 is an access opening, generally located along one half of the said back of the compartment, as at 38, having a cover 39 provided thereon, and which when removed, affording prompt access into the interior of the said storage compartment. See FIG. 5. On the opposite side of the back 12 of the storage compartment is provided another enclosure, functioning generally as a panel box, as at 40, also having a cover 41 provided thereon, which when removed, provides access into the relatively shallow junction box (not shown) to achieve access to the electrical components of this invention, for immediate servicing.

Figure 3:
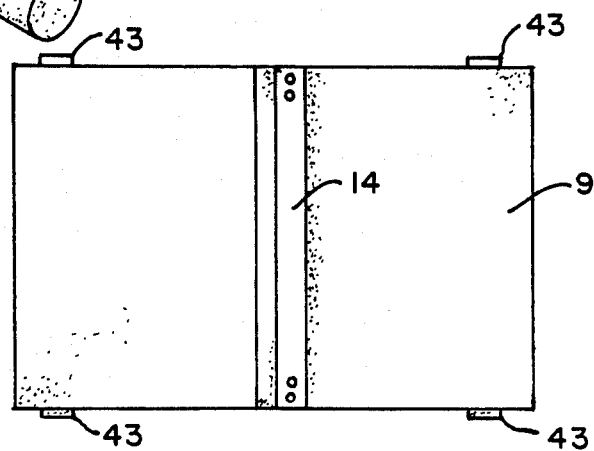
FIG. 3 provides a top view of the apparatus shown in FIG. 2.

Alternate embodiments for this particular invention are envisioned, as previously summarized. For example, as disclosed in FIG. 7, the combined storage compartment and assembly housing can be mounted upon legs, as at 42, and which legs may be secured rigidly to the sides 10 and 11 of the apparatus, to provide for its upright support as disclosed. Mounting pads, as at 43, and as shown in FIGS. 2 through 4, provide threaded apertures wherein fasteners may rigidly secure these legs 42 in place. The legs may be braced, as at 44, to stabilize these supports, and base plates 45 are provided downwardly thereof, in order to stabilize the support of the device upon the ground, or through which fasteners may locate for permanently installing the apparatus to the ground.

Figure 8:
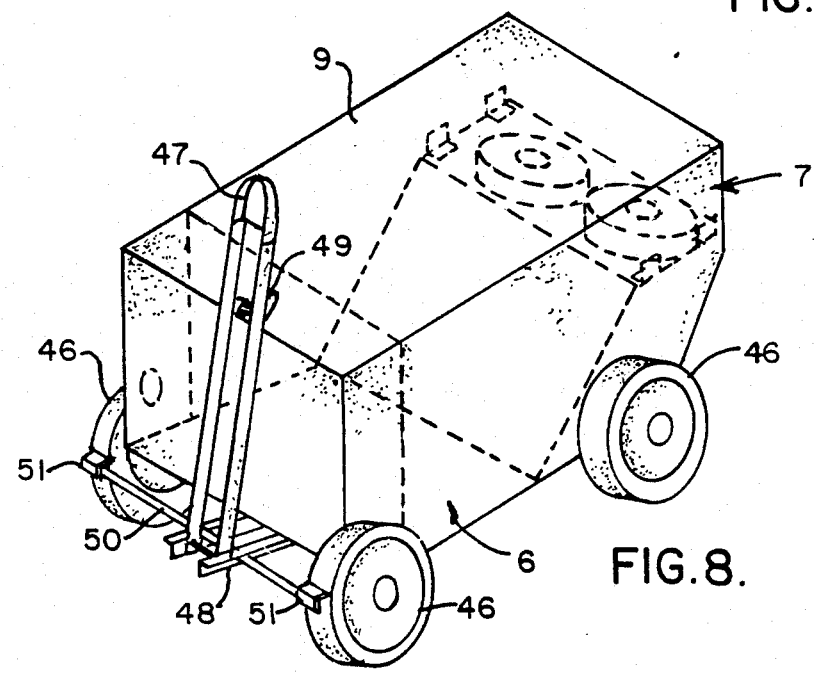
FIG. 8 provides an isometric view of a further alternative application of the ground cable handling apparatus of this invention, wherein its combined storage compartment and assembly housing are mounted upon wheels for adding portability to its application.

Another embodiment for this invention is shown in FIG. 8. As disclosed herein, the combination storage compartment and assembly housing are assembled into a portable unit, mounted upon wheels 46, in order to provide for its ease of movement about the aircraft landing pad. At the back of the compartment is provided a handle 47, which is pivotally mounted to its bracket means 48, and which bracket secures to the underside 13 of the of the storage compartment. When the handle is arranged upright, it may be locked into position by means of the keeper 49, provided proximate the rearward edge of the top wall 9, but that when the handle 47 is pivoted downwardly, or moved downwardly, it can be angulated into position for providing for the pull of the entire unit to another location. In addition, there is a cross bar 50 slidably mounted within the bracket 48, is responsive to the upward or lower movements of the handle 47, as it is pivoted about the said bracket 48, so that when the handle is arranged in the position as shown in FIG. 8, and locked in place by means of the keeper 49, the cross bar 50 will be urged rearwardly, by camming or other means (not shown) provided intermediate the handle 47 and the cross bar 50, so as to urge the stops 51 into braking contact with one or more of the wheels 46, so as to lock the portable cartlike apparatus into its fixed location. On the other hand, when the handle 47 is moved downwardly, as by a pivotal or other movement downward from its disposition shown in FIG. 8, the cross bar 50 is released, can slide forwardly, or be urged forwardly, thereby disengaging its stops 51 from the wheels 46, and thereby allow the apparatus to be freely moved to another location.

Figure 7:
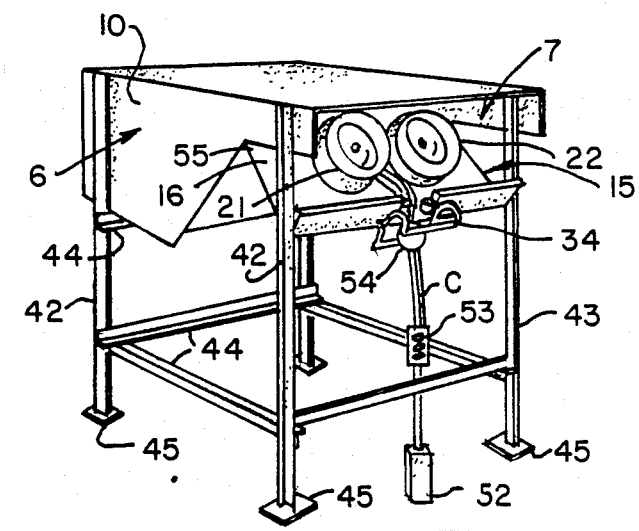
FIG. 7 discloses an alternative means for application of the ground cable handling apparatus of this invention, wherein its storage department and assembly housing are mounted on legs for installation upon the ground.

The actual locating of the cable within the storage compartment 6, and its passage through the assembly housing 7, can be more accurately depicted, once again, upon reviewing FIG. 7. The cable C is disclosed extending upwardly from its electrical connector 52, and which is the standard type of connector that is customarily employed at the end of such an aircraft ground cable, and which can plug into the plane. A control box 53 is provided upon the cable, and furnishes the various push buttons which can provide for a retrieval, a feed out, or other manipulations to be provided upon the cable, or even initiate the conducting of electrical charge to the aircraft. A stop means 54 is also provided upon the cable, and is arranged and adjusted at a location where it will encounter the locating frame member 35, pivoted rearwardly, for disengagement of its electrical switch 36, as when the cable has reached the full extent of its retrieval, and it is desired to shutoff the motor means 31, and discontinue any further retraction of said cable. And, as can also be seen from this figure, the cable C extends intermediate the friction wheels 21 and 22, is pressure biased therebetween, so that the wheels can have a driving effect upon the cable, as during its retracting or feed out. In this particular instance, all of the remaining cable would be stored within the hopper or bin for the storage compartment 6, as previously explained, and this may comprise anywhere from forty to eighty feet of such ground cable.

As also can be seen in FIG. 7, and was briefly previously alluded to, an alternative method for mounting of the cable moving assembly 15 to the apparatus, is disclosed. In this particular instance, a hinge means 55 provides for the pivotal connection of the base means 16 to either the upper edge of the inclined wall 8 of the storage compartment 6, or perhaps to the lower edges of the proximate side walls 10 and 11. In this particular instance, when the fasteners 19 are removed, the entire cable moving assembly 15 can be pivoted downwardly, as can be seen, and the cable will follow the same course therewith, all of which readily exposes the internal operating components for the assembly, as shown, for their ready servicing.

Figure 9:
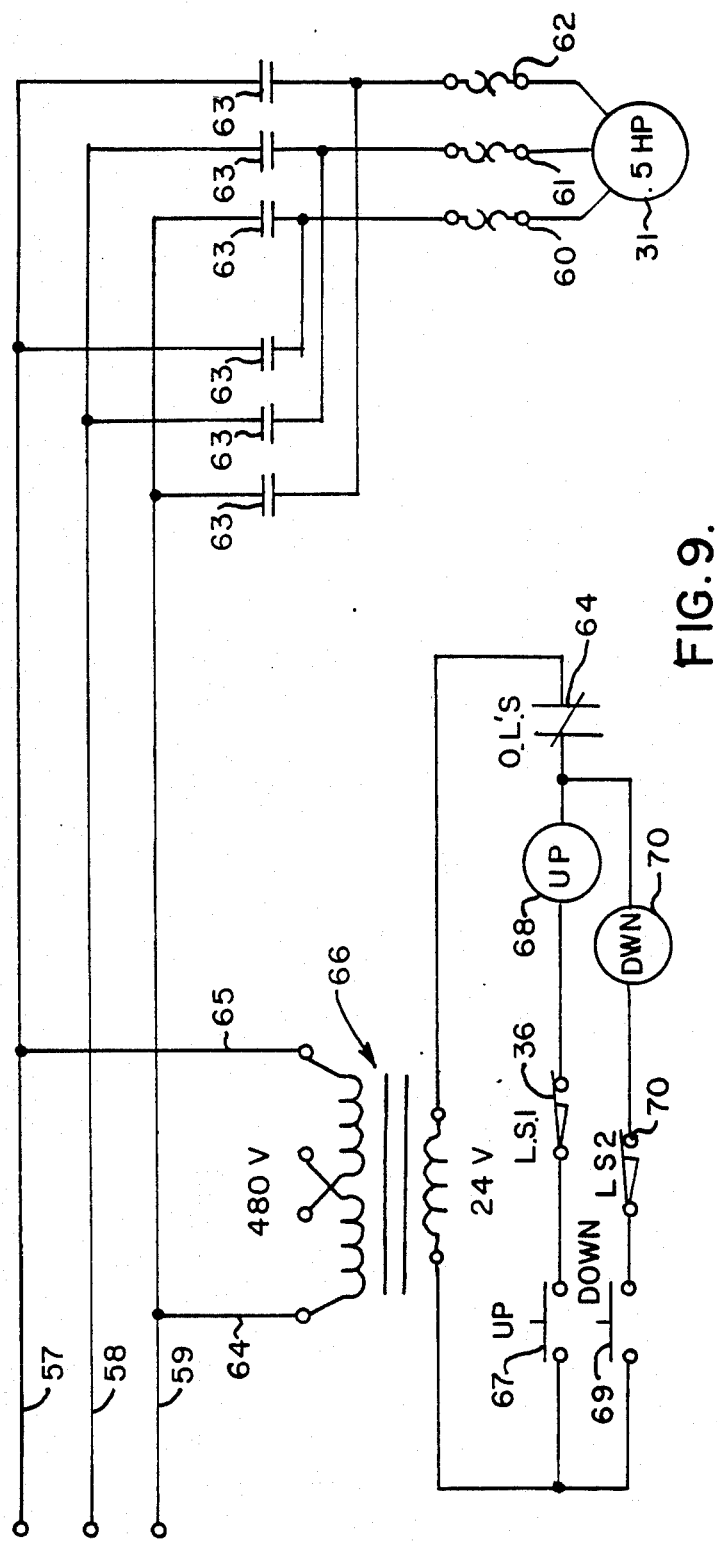
FIG. 9 provides a circuit diagram of the electrical components embodied in this invention.

As also previously briefly described, in referring once again to FIG. 5, there is an electrical panel box 40 associated with the back wall 12 of the storage compartment. Various electrical components, as generally depicted at 56, may be contained within the panel box, and therein are conveniently disposed for ready servicing, upon removal of the cover 41, with these components providing the control for the electrical charge that is utilized for functioning of this particular apparatus. In referring also to FIG. 9, an example of the type of electrical controls utilized with this invention are shown. For example, three phase electrical power is delivered to the apparatus by way of the circuit lines 57 through 59. Such charge normally may be in the vicinity of 480 volts AC, be three phase, and operate at 60 Hz. This constitutes the electrical power delivered from the loading bridge to the circuit panel, as previously explained. The charge is conducted directly to the reversing motor 31, as previously explained, and reversing starter switches 60 through 62 are provided and which are selectively engaged depending upon whether it is desired to energize the motor for a feed out of the ground cable, or a retrieval of the same. Also provided within the series of circuit lines are the fuse like switches 63, which are in communication with an overload switch, as at 64, so that when excessive heat builds up in the operations of this apparatus, as when a malfunction occurs, these heat sensitive switches are disconnected, for shutting off the operations of the motor. It might be commented that the forward and reverse type switches 60 through 62 are rather standard configurations, and are the type that can be obtained from Furnas Electrical Corporation, located at Batavia, Illinois. Voltage is tapped from two of the circuit lines 57 and 59, by way of the circuit lines 64 and 65, which connect with the step down transformer 66, for reducing the 480 volts to the vicinity of 24 volts, at the secondary side of the transformer, as can be seen. This voltage then provides a charge for functioning of the various switch means and coils provided within this location of the circuitry for the apparatus, and functions as follows. For example, a switch 67 is provided, and which when initiated, provides for an upward movement, or a retrieval, of the ground cable, and when this particular switch is closed, its associated coil 68 provides for a select closure of a pair of the switches 60 through 62, which allows the motor means 31 to turn in a particular direction, that urges the drive wheel 22 to turn in a direction that causes a retrieval of the ground cable C. When the cable is almost fully retracted, and the stop means 54 engages the frame bracket 34, the bracket is pivoted, and its limit switch, as previously identified at 36, opens, providing for a de-energization of the motor 31. When the down button 69 is closed, its associated coil 70 engages select of the starter switches 60 through 62, providing for energization of the motor means 31 in an opposite direction of turn, thereby allowing for the feed out or dispensing of the cable, downwardly or to the front of the cable handling apparatus, and for a delivery of sufficient cable for plug in of electrical connector 52 to the aircraft. But, as the full quantity of ground cable is fed from the apparatus, or from its storage compartment 6, another limit switch 71 becomes disengaged, thereby shutting off the operations of the electrical motor means 31. As an example, a wire cable may connect between the approximate back end of the cable, and tie into the limit switch 71, so that when the cable begins to reach the end of its dispensing, the wire may be pulled, which in turn pulls the limit switch 71 into disengagement, thereby shutting off the electrical charge to the said motor. These various switches 67 and 69 may be provided upon the control box 53, provided upon this cable C, as aforesaid.

Variations or modifications to this invention may occur to those skilled in the art upon reviewing the subject matter of this disclosure. Such variations or modifications, if within the spirit of this invention, are intended to be encompassed within any claims to patent protection issuing upon the same. The description of the preferred embodiment set forth herein is done so for illustrative purposes only.

Having thus described the invention what is claimed and desired to be secured by Letters Patent is:

1. An aircraft ground cable handling mechanism for use in the feed out, retrieval, and storage of an electrical cable, comprising, a storage compartment, a cable moving assembly housing, said storage compartment and assembly housing being in communication with each other, said assembly housing being arranged upwardly and extending forwardly of the said storage compartment, a pair of side walls forming the side walls for both the storage compartment and the assembly housing, a common upper wall for both the storage compartment and the assembly housing connecting to the said side walls, a back wall for the storage compartment connecting to the said side walls, a bottom wall for the storage compartment connecting to the said side walls, and a front wall for the storage compartment connecting to the side walls, said front wall arranged inclined towards the assembly housing for facilitating the feed out and retrieval of the ground cable from the said storage compartment during operation of the cable handling mechanism, a cable moving assembly provided within the assembly housing and when operative functioning to withdraw said cable from the storage housing for delivery to the aircraft or retrieving said cable for return into the said storage compartment, said cable moving assembly being disposed adjacent the storage compartment and substantially aligned therewith for delivery of a quantity of cable for unencumbered storage within the said compartment or withdrawal therefrom, said cable moving assembly being supported upon a base means, said base means being shiftably mounted between said pair of side walls and capable of at least partial removal therefrom to facilitate servicing of the cable moving assembly, said cable moving assembly including a pair of friction wheels aligned for biasing against said cable when arranged intermediate thereof, one of said friction wheels being shiftable with respect to the other wheel, and pressure biased in a direction towards the same to exert a pressure against said electrical cable arranged intermediate thereof, and a motor means operatively associated with the cable moving assembly for turning of at least one of the said friction wheels to achieve the said feed out or retrieval of the ground cable.

2. The invention of claim 1 and including a storage compartment access opening provided through the said back wall.

3. The invention of claim 2 and including a cover for the said access opening, and secured to the said back wall.

4. The invention of claim 1 and including locating frame means connecting with the assembly housing and aligning the said ground cable intermediate the said friction wheels, switch means responsive to the movement of the said locating means, whereby upon actuation of the locating means effecting actuation of the switch means for curtailing operations of the motor means and terminating further retrieval of the ground cable into the storage compartment.

5. The invention of claim 4 and including another switch means responsive to the feed out of the ground cable and terminating further dispensing of the stored cable from the stogage compartment as the cable end approaches.

6. The invention of claim 1 and wherein said cable moving assembly supported upon the base means, being pivotally connected with the pair of side walls of the said assembly housing and storage compartment to accommodate its shifting to facilitate the servicing of said cable moving assembly.

7. The invention of claim 2, and including hinge means secured to the base means of the cable moving assembly, and also connecting with the side walls to accommodate the pivotal movement of the base means for attaining access to the cable moving assembly to facilitate its servicing.

8. The invention of claim 1 and wherein said cable moving assembly and its base means being slidably disposed with respect to the said side walls to accommodate the shifting of the said base means to facilitated the servicing of the said cable moving assembly.

9. The invention of claim 8 and including fastener means securing said base means to the assembly housing.

10. The invention of claim 8 and including angle means provided proximate the bottom of the side walls of the assembly housing, and said angle means supporting said base means and cable moving assembly with respect to the assembly housing.

11. The invention of claim 1 and wherein said mechanism being employed in conjunction with the passenger tunnel of an airline terminal, bracket means securing to the common upper wall and provided for connecting the cable handling mechanism suspended to the underside of the said tunnel.

12. The invention of claim 1 and wherein said mechanism being installed with respect to the ground, supports securing with the storage compartment and useful for stably mounting the mechanism upon the ground.

13. The invention of claim 1 and wherein said mechanism being portable, a series of wheel means rotatably mounted to at least said storage compartment and disposed for facilitating the wheeled movement of said cable handling mechanism.

14. The invention of claim 13 and including handle means securing with said storage compartment and provided for facilitating the wheeled movement of the said cable handling mechanism.

15. The invention of claim 14 and including brake means operatively associated with at least one of the wheel means and when engaged preventing the wheeled movement of the cable handling mechanism.

16. The invention of claim 15 and wherein said handle means incorporating bracket means whereby upon actuated movement of the handle means causes said brake means to engage the wheel means for preventing movement of the cable handling mechanism.

17. The invention of claim 16 and wherein the upward actuation of the handle means provides for wheel means engagement by the brake means.

18. The invention of claim 17 and wherein the upward actuation comprises a pivotal upward movement of the handle means.

19. The invention of claim 17 and wherein the downward actuation of the handle means releases the brake means.

20. The invention of claim 1 and including an electrical circuitry panel compartment provided proximate the back wall of the storage compartment.

21. The invention of claim 1 and wherein said friction wheels being normally spaced apart a dimension less than the diameter of the ground cable being handled, thereby exerting force upon the ground cable and to frictionally achieve its movement during feed out and retrieval.

22. The invention of claim 21 and wherein one of said friction wheels being shiftable laterally with respect to the cable to provide clearance for installation and removal of the cable during servicing.

23. The invention of claim 22 and including clamp means operatively associated with the base means and when engaged biasing the said shiftable friction wheel towards the said cable.

24. The invention of claim 23 and including spring means structured within the clamp means and urging the said shiftable friction wheel towards the other friction wheel for biasing against the said cable.

25. The invention of claim 24 and including an axle for the said shiftable friction wheel, there being a slot provided through the base means, and said axle extending therethrough, a mounting means for the said axle and stabilizing it upon the said base means for shifting within its said arranged slot, whereby upon actuation of the said clamp means exerting a bias against the shiftable frictional wheel and urging it towards the said contiguous cable.

26. The invention of claim 25 and wherein said clamp means being releasable for removing the bias of the shiftable friction wheel from the said contiguous cable.

27. The invention of claim 1 and including a series of guide rollers provided proximate the friction wheels and provided for aiding the alignment of the ground cable during passage between the said wheels during the functioning of the said mechanism.

* * * * *